(12) United States Patent
Weckerling et al.

(10) Patent No.: US 7,621,816 B2
(45) Date of Patent: Nov. 24, 2009

(54) DRIVESHAFT COMPRISING A COUNTER TRACK JOINT FEATURING A DELIMITED AXIAL DISPLACEMENT PATH

(75) Inventors: Thomas Weckerling, Bonn (DE); Orkan Eryilmaz, Lohmar (DE)

(73) Assignee: GKN Driveline International GmbH, Lohmar (DE)

( * ) Notice: Subject to any disclaimer, the term of this patent is extended or adjusted under 35 U.S.C. 154(b) by 0 days.

(21) Appl. No.: 12/045,687

(22) Filed: Mar. 10, 2008

(65) Prior Publication Data

US 2008/0214317 A1    Sep. 4, 2008

Related U.S. Application Data

(63) Continuation of application No. PCT/EP2006/005990, filed on Jun. 22, 2006, and a continuation of application No. PCT/EP2006/005991, filed on Jun. 22, 2006.

(30) Foreign Application Priority Data

Jun. 8, 2005    (DE)    ........... 10 2005 042 910
Sep. 8, 2005    (DE)    ........... 10 2005 042 909

(51) Int. Cl.
    *F16D 3/224*    (2006.01)
(52) U.S. Cl. ......................... 464/145; 464/906
(58) Field of Classification Search ......... 464/140–146, 464/906
    See application file for complete search history.

(56) References Cited

U.S. PATENT DOCUMENTS 3,344,687 A    10/1967    Abbildung 4,915,672 A    4/1990    Girguis
6,709,337 B2 *  3/2004    Krude .............. 464/145

FOREIGN PATENT DOCUMENTS

| CH | 448 629 A | 8/1966 |
|---|---|---|
| DE | 43 09 559 A1 | 3/1993 |
| DE | 100 60 120 A1 | 12/2000 |
| DE | 102 35 677 A1 | 8/2002 |
| DE | 103 37 612 A1 | 8/2003 |
| EP | 1 203 900 A2 | 5/2002 |
| JP | 09042304 | 2/1997 |
| WO | WO 2005/045270 | 5/2005 |

OTHER PUBLICATIONS

GKN Constant Velocity Products Catalog, GKN Automotive, Inc. Auburn Hills, MI 1993, p. 16.*

* cited by examiner

*Primary Examiner*—Greg Binda
(74) *Attorney, Agent, or Firm*—Rader, Fishman & Grauer PLLC

(57) ABSTRACT

A constant velocity universal ball joint 11 having first and second outer ball tracks 16, 18, and first and second inner ball tracks 17, 19, forming first pairs of tracks 16, 17 which widen in a first axial direction Ri1 (α), and forming second pairs of tracks 18, 19 which widen in a second axial direction Ri2 (β). Balls 20 are guided in the pairs of tracks and have centers Z positioned on a pitch circle radius PCR around a joint centre M. A ball cage 21 holds the balls 20 in a common central plane E on to the angle-bisecting plane when the joint is articulated. There is provided an axial clearance permitting a relative axial displacement S wherein, when in the aligned condition, the ratio between the axial clearance S and the pitch circle radius PCR ranges between 0.01 and 0.09 (0.01<S/PCR<0.09).

14 Claims, 17 Drawing Sheets

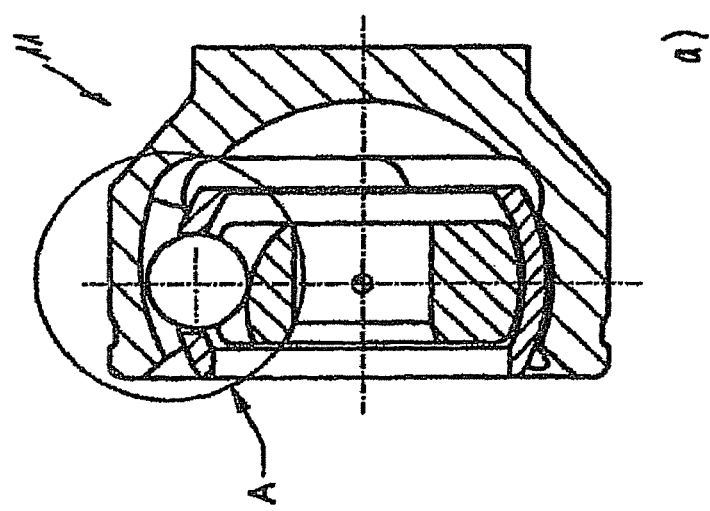
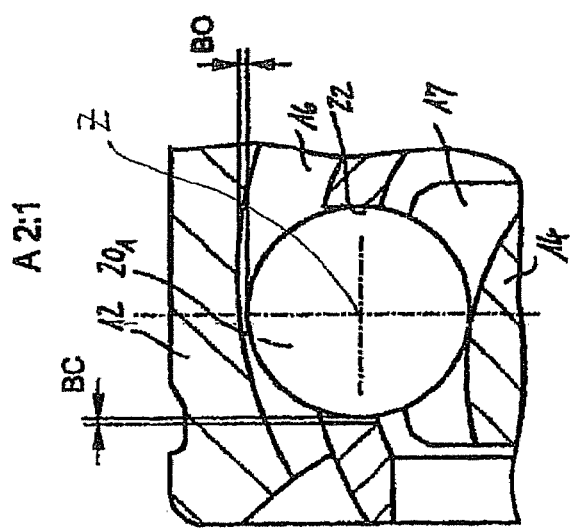
FIG. 6
−0.03 < BC < 0.1
−0.03 < BO < 0.08

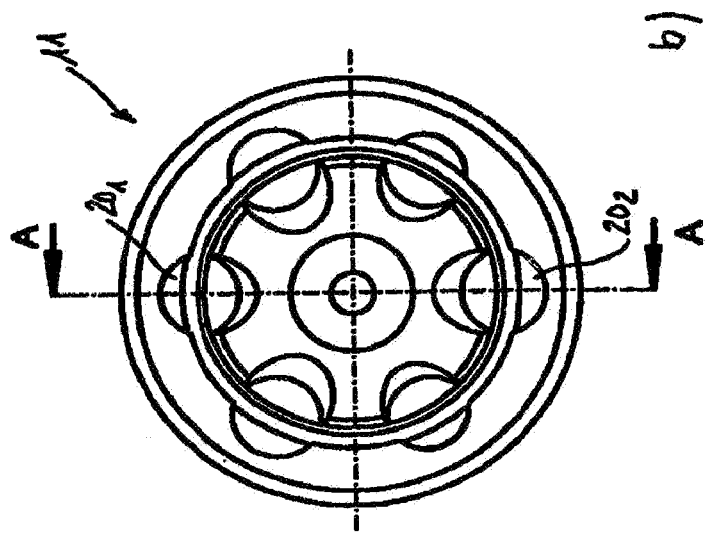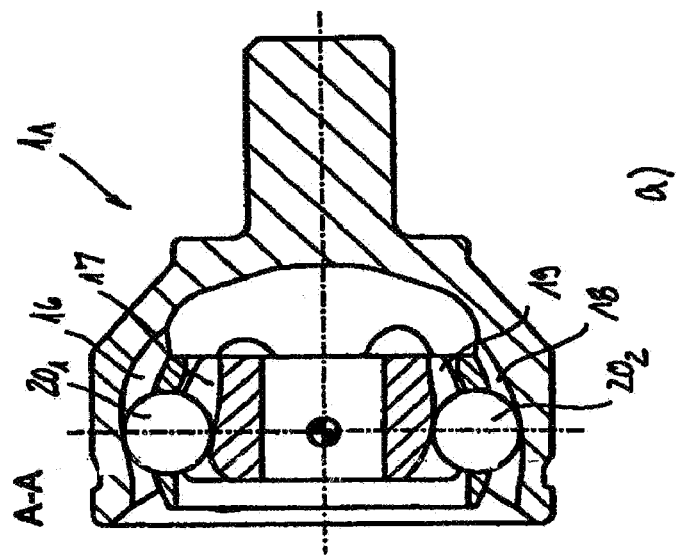
FIG.7

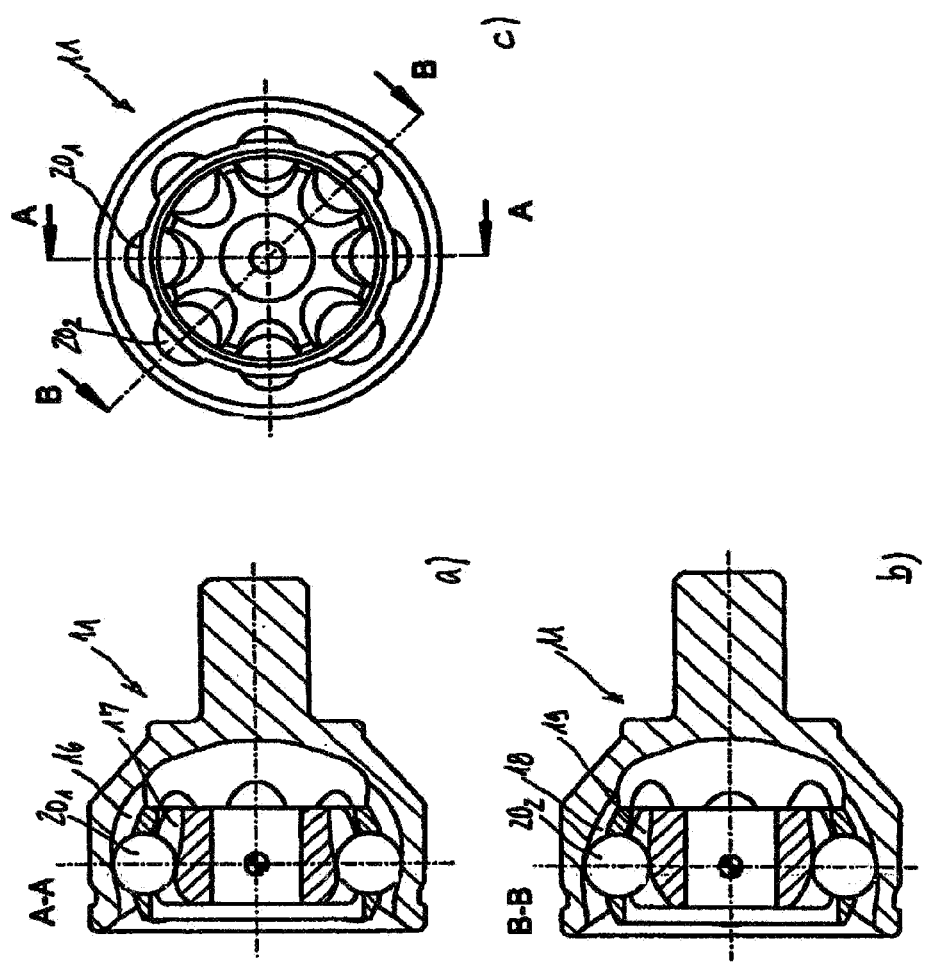

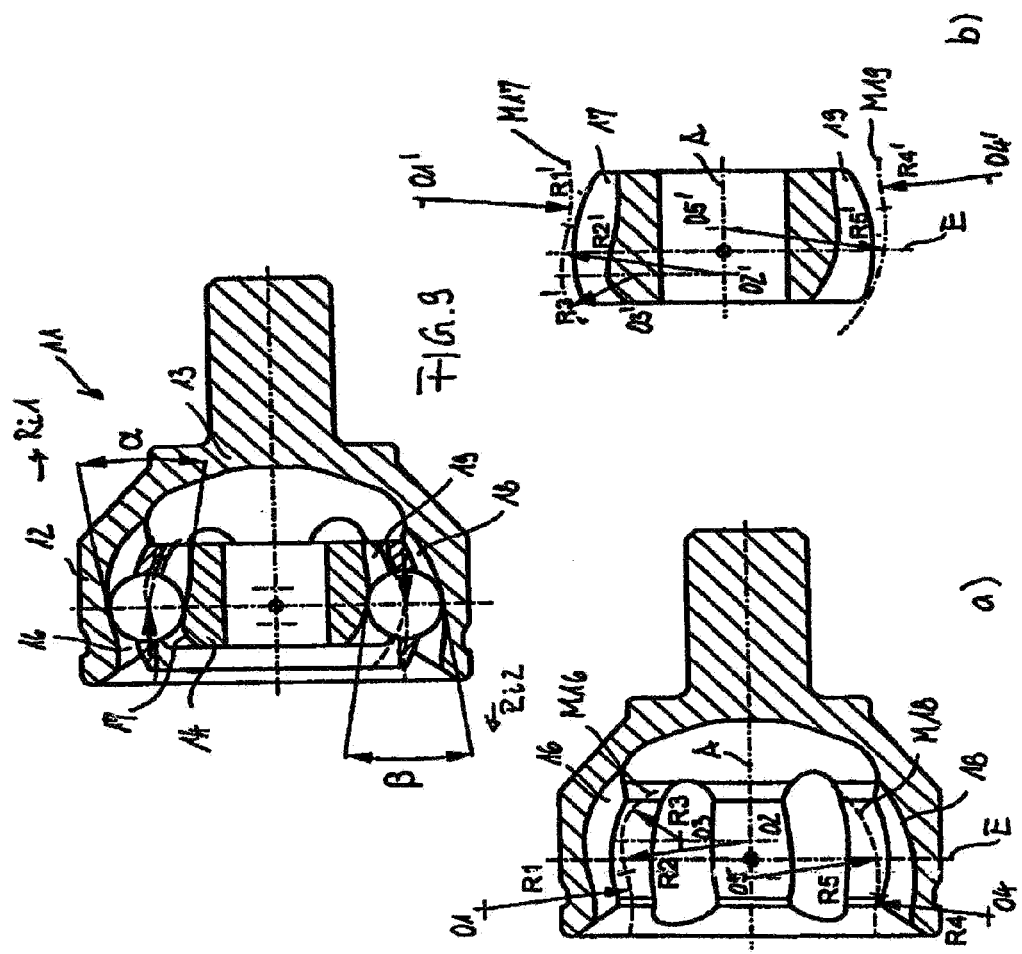

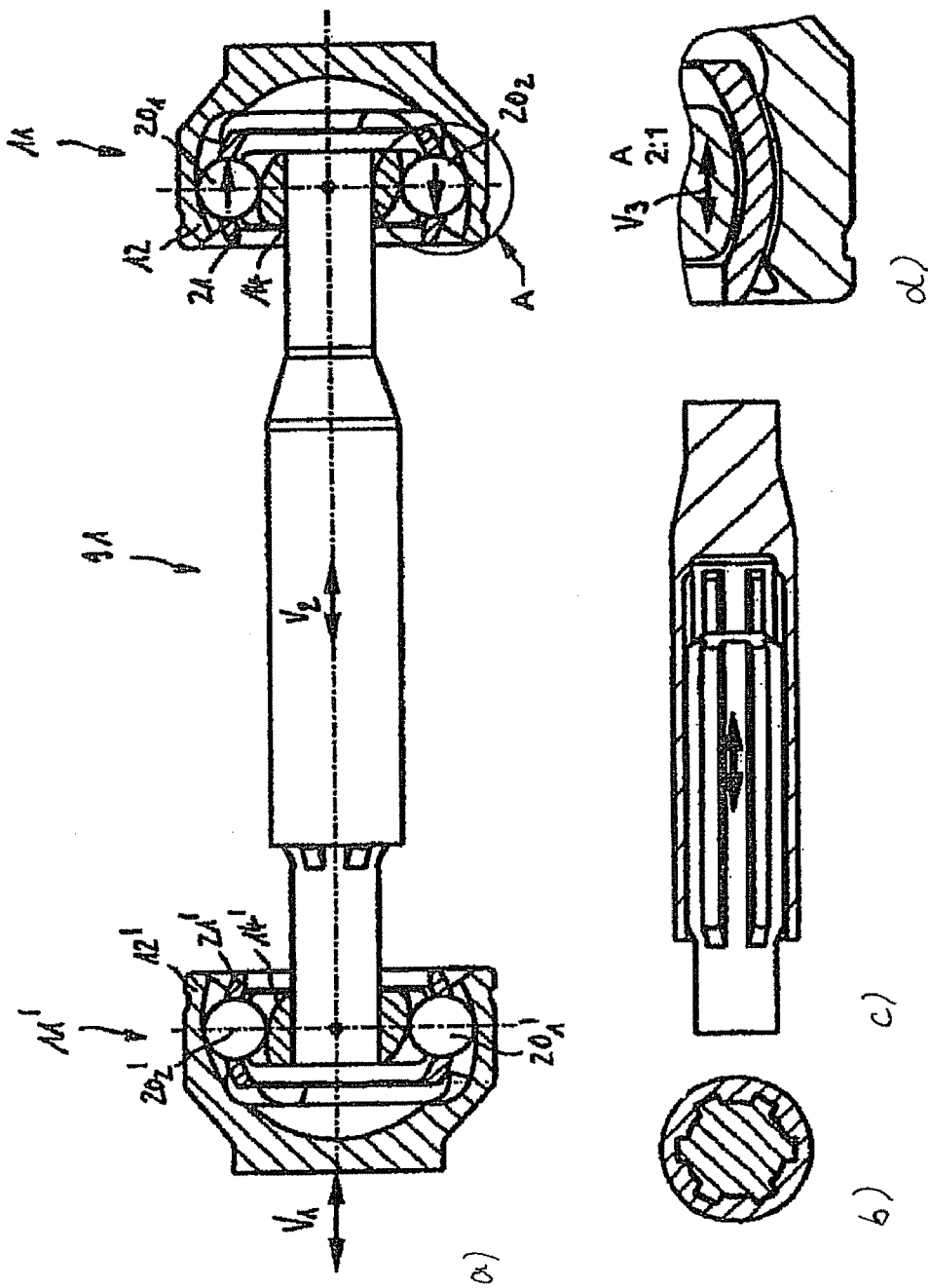

DRIVESHAFT COMPRISING A COUNTER TRACK JOINT FEATURING A DELIMITED AXIAL DISPLACEMENT PATH

RELATED APPLICATIONS

This application is a continuation of and claims the benefit of PCT Application No. PCT/EP2006/005990 filed on Jun. 22, 2006 (claiming priority from currently pending German Application No. 10 2005 042 909.2 filed Sep. 8, 2005), entitled "Driveshaft Comprising A Counter Track Joint Featuring A Delimited Axial Displacement Path"and PCT Application No. PCT/EP2006/005991 filed on Jun. 22, 2006 (claiming priority from currently pending German Application No. 10 2005 042 910.6 filed Sep. 8, 2005) entitled "Counter Track Joint With Limited Axial Displacement."

TECHNICAL FIELD

The invention relates to a driveshaft comprising a first universal joint, an intermediate shaft and a second universal joint, wherein the first universal joint is a constant velocity universal ball joint in the form of a counter track joint.

BACKGROUND OF THE INVENTION

Counter track joints of the type used as a first universal joint are described in DE 100 60 120 A1, and it is assumed that an axial displacement path has to be delimited as a function of the control angles occurring. In their axial central position, counter track joints of said type are free from axial forces and are therefore suitable for disconnecting lower vibrations in the driveline. However, if an axial displacement takes place under torque load, axial forces are built up, so that axial vibrations may be transmitted. If the axial displacement path is too long, the advantage of no axial forces or low axial forces is lost. It is therefore the object of the present invention to propose a driveshaft comprising a joint of said type which can effectively contribute towards disconnecting vibrations in drivelines.

SUMMARY OF THE INVENTION

The above-mentioned objective is achieved by providing a driveshaft comprising a first universal joint; an intermediate shaft; and a second universal joint, wherein the first universal joint is a constant velocity universal ball joint in the form of a counter track joint comprising an outer joint part with first and second outer ball tracks, an inner joint part with first and second inner ball tracks, wherein first outer ball tracks, together with first inner ball tracks, form first pairs of tracks which widen in a first axial direction Ri1 and wherein second outer ball tracks, together with second inner ball tracks, form second pairs of tracks which widen in a second axial direction Ri2; balls which are guided in the pairs of tracks and whose ball centres Z are positioned on a pitch circle radius PCR around a joint centre M; a ball cage with circumferentially distributed cage windows, in which ball cage the balls are held in a common central plane E and, when the joint is articulated, are guided on to the angle-bisecting plane, wherein between the outer joint part and the ball cage on the one hand and between the ball cage and the inner joint on the other hand there are provided axial clearances which permit a relative axial displacement S between the outer joint part and the inner joint part.

Joints of the type referred to here are described in DE 100 60 120 A1, and it is assumed that the axial displacement path has to be delimited as a function of the control angles occurring. In their axial central position, joints of said type are free from axial forces and are therefore suitable for disconnecting vibrations in the driveline. However, if an axial displacement takes place under torque load, there are built up axial forces, so that axial vibrations may again be transmitted. If the axial displacement path is too long, the advantage of no or low axial forces is lost. It is the object of the present invention to propose a joint of said type which, in the permissible displacement range, builds up only low axial forces, so that the joint can be effectively used in drivelines for vibration disconnecting purposes.

More particularly, it is proposed that the ratio between the total axial displacement S and the pitch circle radius PCR of the balls—when the joint is in the aligned condition—ranges between 0.01 and 0.09 (0.01<S|PCR<0.09). If this axial displacement path referring to the joint size is observed, the axial forces resulting in the operating range of the joint are prevented from becoming to high.

According to a preferred embodiment, the ratio between the total axial displacement S and the pitch circle radius PCR of the balls—when the joint is in the aligned condition—is less than 0.05 (S/PCR<0.05). The axial forces are particularly low if the differences between the opening angles of the pairs of tracks are relatively small. It is therefore proposed that when the joint is in the aligned condition, in the end positions of the relative axial displacement between the outer joint part and the inner joint part, the respective smaller opening angle $\alpha$ or $\beta$ of the first pairs of tracks or of the second pairs of tracks is smaller than 8° ($\alpha<8°$ v $\beta<8°$). A further reduction in the opening angle of the pairs of tracks can be such that, when the joint is in the aligned condition, in a central position of the relative axial displacement path between the outer joint part and the inner joint part, in which the opening angles $\alpha$ and $\beta$ of the first pairs of tracks and of the second pairs of tracks are identical in size, both opening angles $\alpha$ and $\beta$ are smaller than 8° ($\alpha<8°$ ∧$\beta<8°$).

More particularly, it is proposed that at the first universal joint, the inner face of the outer joint part, the outer face of the inner joint part as well as the outer face and the inner face of the ball cage are each faces of spherical portions, wherein the radial clearance COR between the outer joint part and the ball cage, and the radial clearance CIR between the ball cage and the inner joint part each, ranges between 0.015 and 0.20 mm. This measure allows the production of the first universal joint of this type to be advantageously simplified because those surfaces which, in a joint of this type, do not have a guiding function, but only serve as axial stops, can be produced simply by a forming operation or by a simple turning operation. More particularly, it is proposed that, at the outer joint part, after the forming operation providing the necessary excess dimension needed for machining purposes, the inner spherical guiding face for the ball cage is only soft-tuned and subsequently hardened, whereas the ball tracks are only hardened and ground after the forming operation. The guiding face and the ball tracks can be hardened by induction hardening in one single operation.

It is further proposed as an advantageous dimensioning measure that the axial clearance BC of the balls in the cage windows ranges between −0.03 mm (press fit) and 0.1 mm (clearance fit).

According to a further preferred dimensioning measure, it is proposed that at the first universal joint, the radial ball clearance BO of the balls in the pairs of tracks ranges between −0.03 mm (press fit) and 0.08 mm (clearance fit). This range of values, like the above-mentioned range, applies to joints of all standard sizes in the automotive industry.

A preferred track design of the respective first universal joint includes first outer ball tracks having track centre lines M16, centrally, that comprise a first arch with the radius R2 whose center O2 is offset by an axial offset from the central plane E of the first universe joint in a first direction, and that the track centre lines M16, subsequent to the first arch, in the first direction, increasingly deviate radially inwardly from said radius R2, and that track center lines M17 of the first inner ball tracks, centrally, comprise a second arch with the radius R2' whose center O2' is offset by an axial offset from the central plane E of the first universal joint in a second direction, and that the track centre lines M17, subsequent to the second arch, in the second direction, increasingly deviate radially inwardly from the radius R2'. Further, the track centre lines M16 of the first outer ball tracks, subsequent to the first arch with the radius R2, in the first direction, comprise a third arch with a smaller radius R3 which is curved in the same direction and which continuously adjoins the former, and that the track centre lines M17 of the first inner ball tracks subsequent to the second arch with the radius R2', in the second direction, comprises a fourth arch with a smaller radius R3' which is curved in the same direction and which continuously adjoins the former. The track centre lines M16 of the first outer ball tracks, subsequent to the first arch with the radius R2, in the second direction, increasingly deviate radially outwardly from the radius R2 and that the track centre lines M17 of the first inner ball tracks, subsequent to the second arch with the radius R2', in the first direction, increasingly deviate outwardly from the radius R2'. Also, the track centre lines M16 of the first outer ball tracks, subsequent to the first arch with the radius R2, in the second direction, comprise a fifth arch with radius R1, whose curvature extends in the opposite direction and which continuously adjoins the former and whose centre O1 is positioned outside a circle with a radius R2 around a centre M2 and that the track centre lines M17 of the first inner ball tracks, subsequent to the second arch with the radius R2', in the first direction, comprise a radius R1' whose curvature extends in the opposite direction, which continuously adjoins the former and whose centre O1' is positioned outside a circle with a radius R2' around a centre O2'. The first universal joint includes second outer ball tracks having track centre lines M18, centrally, that comprise a sixth arch with radius R5 whose centre O5 is offset by an axial offset 5 from the central plane E of the first universal joint in the second direction, and that the track centre lines M18, subsequent to the sixth arch, in the second direction, increasingly radially outwardly deviate from the radius R5, and that track centre lines M19 of the second inner ball tracks, centrally, comprise a seventh arch with radius R5' whose centre O5' is offset by an axial offset from the centre plane E of the first universal joint in the first direction, and that the track centre lines M19, subsequent to the seventh arch, in the first direction, increasingly radially outwardly deviate from the radius R5'. Further, the track centre lines M18 of the second outer ball tracks, subsequent to the sixth arch with the radius R5, in the second direction, comprise an eighth arch with radius R4 whose curvature extends in the opposite direction and which continuously adjoins the former and whose centre O4 is positioned outside a circle with the radius R5 around said centre O5, and that the track centre lines M19 of the second inner ball tracks, subsequent to the seventh arch with the radius R5', in the first direction, comprise an arch with the radius R4' whose curvature extends in the opposite direction and which continuously adjoins the former and whose centre O4' is positioned outside a circle with the radius R5' around said centre O5'. In this way it is ensured that large articulation angles become possible at the first universal joint and that, even at such large articulation angles, irrespective of the axial displacement position, it is possible to maintain good ball control conditions as a result of the track forces and thus a reliable control of the first universal joint. Said track design has so far only been proposed for fixed joints without the possibility of achieving an axial displacement (DE 103 37 612 A1).

The first universal joint can preferably be provided with six balls or with eight balls.

As far as the design of the second universal joint of the inventive driveshaft is concerned, it is proposed that the second universal joint is an axial plunging joint, more particularly in the form of a tripode joint, a VL plunging joint or an XL plunging joint or a DO plunging joint. Alternatively, it is proposed that the second universal joint is provided in the form of a fixed joint, more particularly in the form of a Cardan joint, an AC joint, a UF-joint or a counter track joint. As far as the latter alternative is concerned it is additionally proposed that the intermediate shaft is an axial plunging unit, so that even a driveshaft composed in this way can accommodate substantial changes in length. In all the above-mentioned variants, any vibrations axially introduced into the driveshaft can be disconnected in the first universal joint provided in the form of a displaceable counter-track joint via the low-force axial displaceability of same to an extent which cannot be achieved by prior art joints and axial plunging units.

BRIEF DESCRIPTION OF THE DRAWINGS

FIG. 6 shows the joint according to FIGS. 1 to 5
 a) in the illustration according to FIG. 5a
 b) in an enlarged detail according to illustration a).

FIG. 7 shows a counter track joint for an inventive driveshaft in a second embodiment with six balls and a special track shape
a) in a longitudinal section
b) in an axial view.

FIG. 8 shows a counter track joint for an inventive driveshaft in a third embodiment with a special track shape and eight balls
a) in a longitudinal section A-A
b) in a longitudinal section B-B through the second pairs of tracks
c) in an axial view.

FIG. 9 is an illustration of the joint according to FIG. 7 showing the opening angle in a longitudinal section.

FIG. 10 is an illustration of the details of the joint according to FIG. 9 giving the dimensions of the ball centre lines
a) the outer joint part in a longitudinal section
b) the inner joint part in a longitudinal section

FIG. 18 is an illustration of an inventive driveshaft with a fixed counter track joint as the second universal joint and an axial displacement unit: (a) in a first longitudinal section, (b) in a cross-section, (c) in a second longitudinal section, (d) in an enlarged detail according to (a).

DETAILED DESCRIPTION OF A PREFERRED EMBODIMENT

Figure 1:
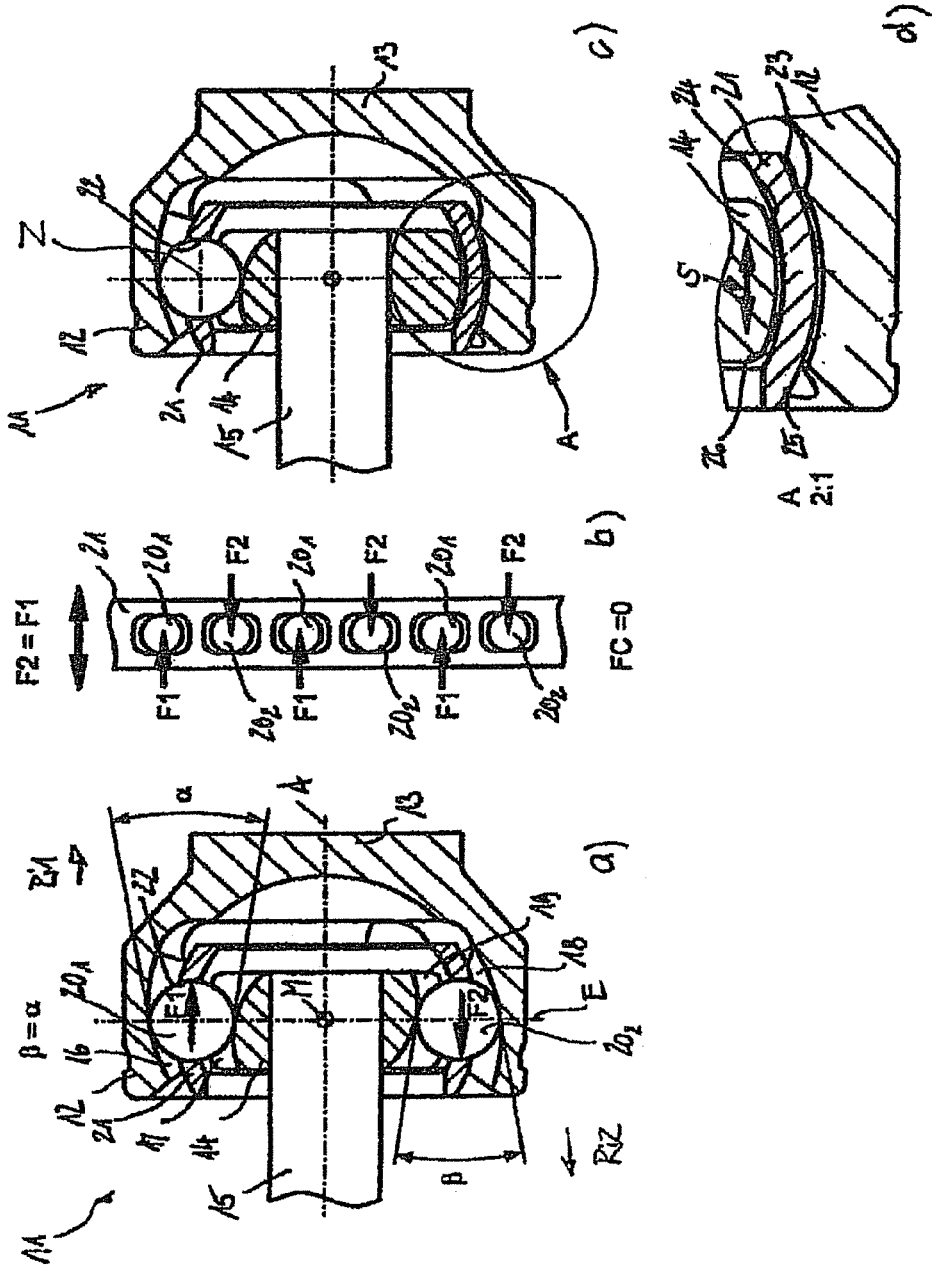
FIG. 1 is an illustration of a counter track joint for an inventive driveshaft in a first embodiment with six balls
 a) in a planar longitudinal section through opposed ball tracks
 b) in a developed view of the ball cage
 c) in a bent longitudinal section through a cage window and a cage web
 d) in an enlarged detail according to illustration c).

The illustrations of FIG. 1 will be described jointly below. An inventive counter track joint 11 comprises an outer joint part 12 with a formed-on base 13, an inner joint part 14 with an inserted shaft 15, pairs of tracks consisting of first outer ball tracks 16 and first inner ball tracks 17 which open in a central joint plane E in a first direction Ri1 towards the base 13, as well as second pairs of tracks consisting of second outer ball tracks 18 and second inner ball tracks 19 which open in a central joint plane E in a second axial direction Ri2 towards the shaft 15. A plurality of first and second pairs of tracks 16, 17 is distributed around the joint circumference. The opening angle of the first pairs of tracks 16, 17 in the central plane E has been given the symbol α; the opening angle of the second pairs of tracks 18, 19 in the central plane E has been given the symbol β. In the pairs of tracks there are accommodated first balls $20_1$ and second balls $20_2$ whose ball centers are positioned on a pitch circle radius PCR around a joint center M. First balls $20_1$ and second balls $20_2$ are held in a ball cage 21 with circumferentially distributed cage windows 22 in a common central plane E. When joint 11 is articulated first balls $20_1$ and second balls $20_2$ are guided on to an angle-bisecting plane. There is also shown the central axis A of the aligned joint, which central axis A intersects the central plane E in the joint centre M. When torque is transmitted, forces F1 are applied to the first balls $20_1$ towards the base 13, with second forces F2 being applied to the second balls $20_2$ towards the shaft 15. In the illustrated central position of the joint, the forces F1 and F2 are identical because the angles α, β are identical in size, so that the sum of all axial forces FC applied to the ball cage 21 equals zero. As can be seen in illustrations c) and d), the ball cage 21 comprises a radial clearance and thus also an axial clearance both relative to the outer joint part 12 and to the inner joint part 14, with the entire axial clearance between the outer joint part 12 and the inner joint part 14 being referred to as "S". In the embodiment illustrated, the outer joint part 12 comprises a spherical inner face 23 and the inner joint part 14 a spherical outer face 24. Furthermore, the ball cage 21 comprises a spherical outer face 25 and a spherical inner face 26.

Figure 2:
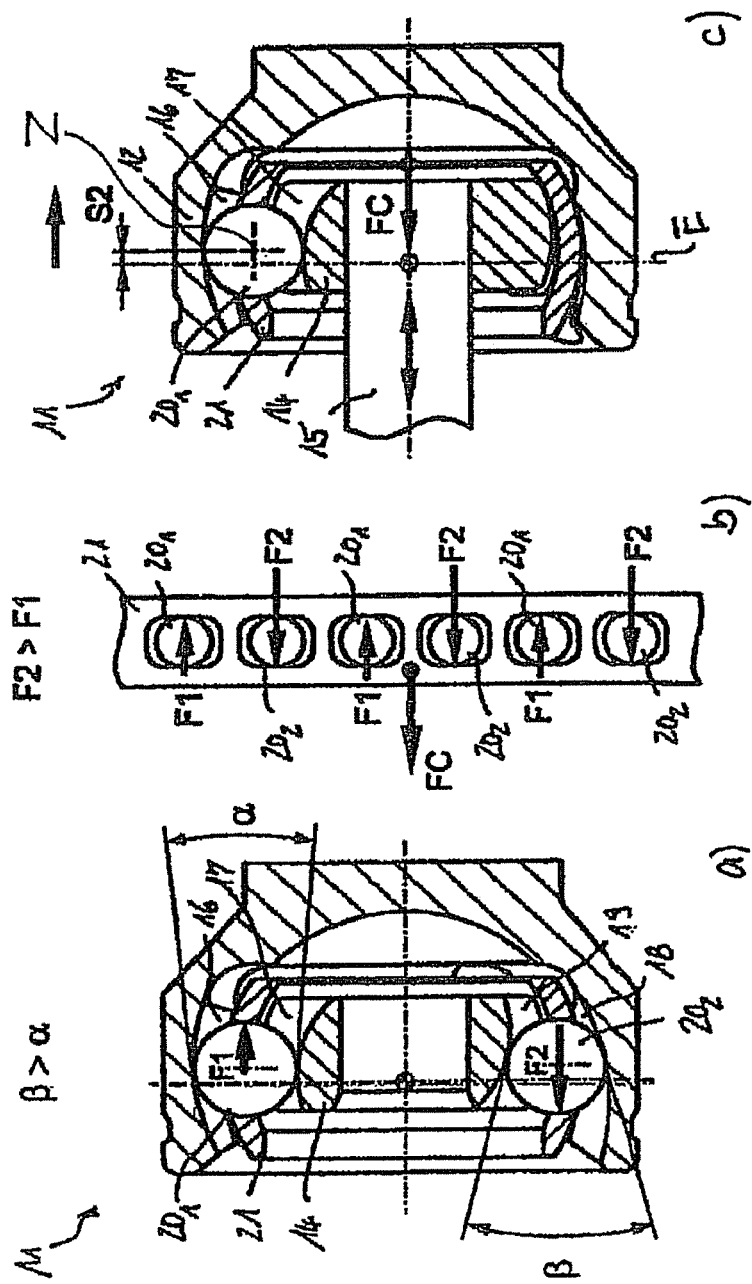
FIG. 2 is an illustration of the joint in the embodiment according to FIG. 1 in an axially displaced position
 a) in a planar longitudinal section through opposed ball tracks
 b) in a developed view of the ball cage
 c) in a bent longitudinal section through a cage window and a cage web.

In FIG. 2, details identical to those shown in FIG. 1 have been given the same reference numbers. Therefore, reference is made to the preceding description. The individual illustrations of FIG. 2 will be described jointly below. The joint is shown in a position in which the inner joint part 14 is displaced relative to the central plane E referring to the outer joint part 12 by the axial displacement path S2 in the first direction. As a result of said displacement, the opening angle α of the first pairs of tracks 16, 17 becomes smaller, whereas the opening angle β of the second pairs of tracks 18, 19 becomes greater. As a result, during the transmission of torque, the axial forces F1 applied to the first balls $20_1$ become smaller and the axial forces F2 applied to the second balls $20_2$ become greater. The sum of the axial forces FC is thus not equal to zero and extends towards the shaft 15. In this position, the cage and thus the joint as a whole can no longer be displaced in an axially force-free way.

Figure 3:
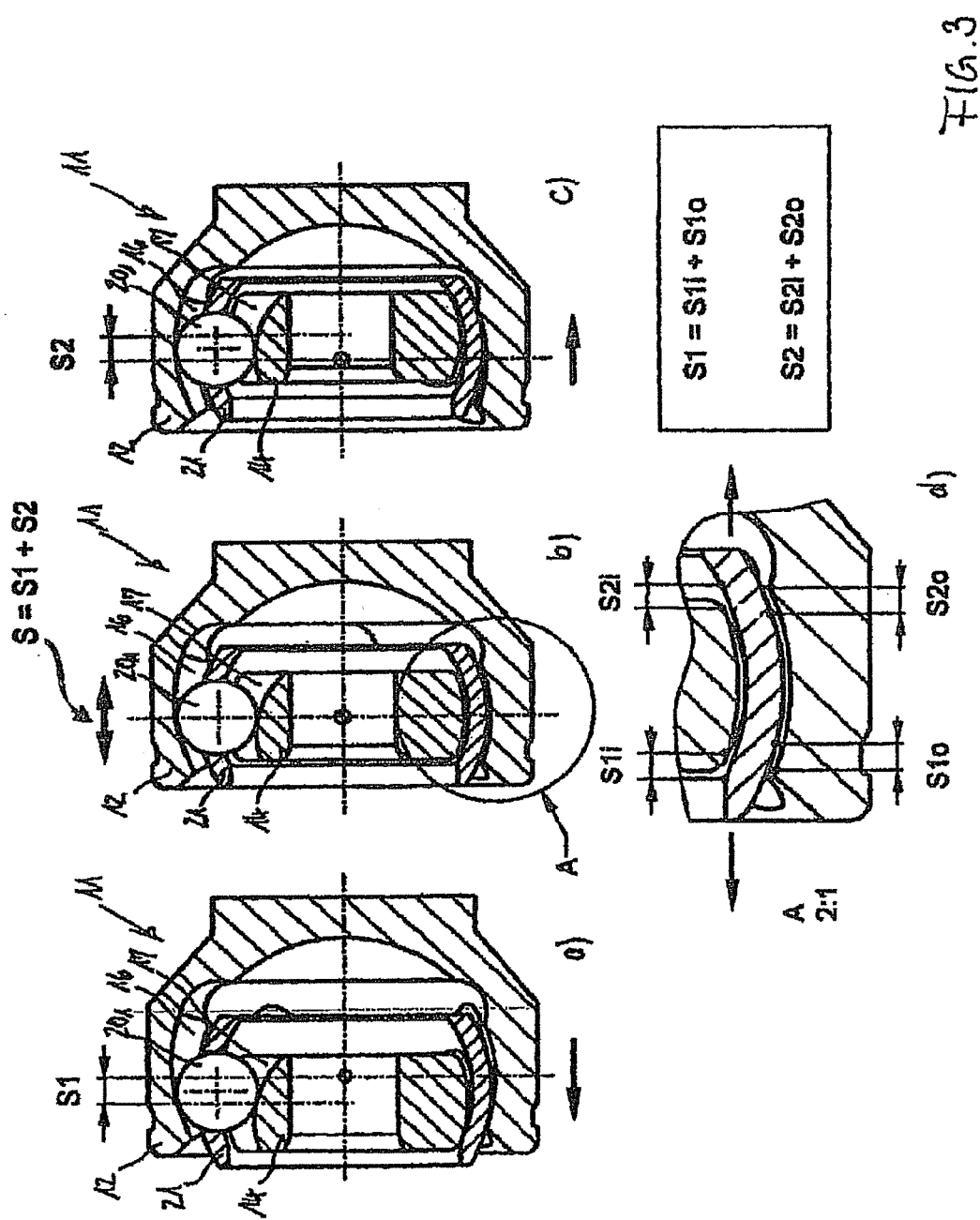
FIG. 3 is an illustration of the joint in an embodiment according to FIGS. 1 and 2 in a bent longitudinal section through a cage window and a cage web
 a) in a first position axially displaced by the maximum amount
 b) in the central axial position
 c) in a second position axially displaced by the maximum amount
 d) in a enlarged detail according to illustration b).

In FIG. 3, details identical to those shown in FIGS. 1 and 2 have been given the same reference numbers. Therefore reference is made to the preceding description. In illustration b), the joint is shown in the axial section in the central axial position according to FIG. 1c. The enlarged detail shows that the inner joint part 14 comprises the axial clearances S1i and S2i relative to the ball cage 21. Furthermore, it can be seen that the ball cage 21 comprises the axial clearances S1o and S2o relative to the outer joint part 12. As a result, the maximum displacement path S1 shown in illustration a) in one direction, corresponds to the sum of S1i and S1o, and the maximum displacement path S2 in the opposite direction shown in illustration c) corresponds to the sum of S2i and S2o. In the respective end positions, the ball cage 21 abuts the inner joint part 14 and/or the outer joint part 12. The total displacement path S is obtained as the sum of S1 and S2, with "S" referring to the displacement of the inner joint part 14 relative to the outer joint part 12 from one abutment to the other abutment.

Figure 4:
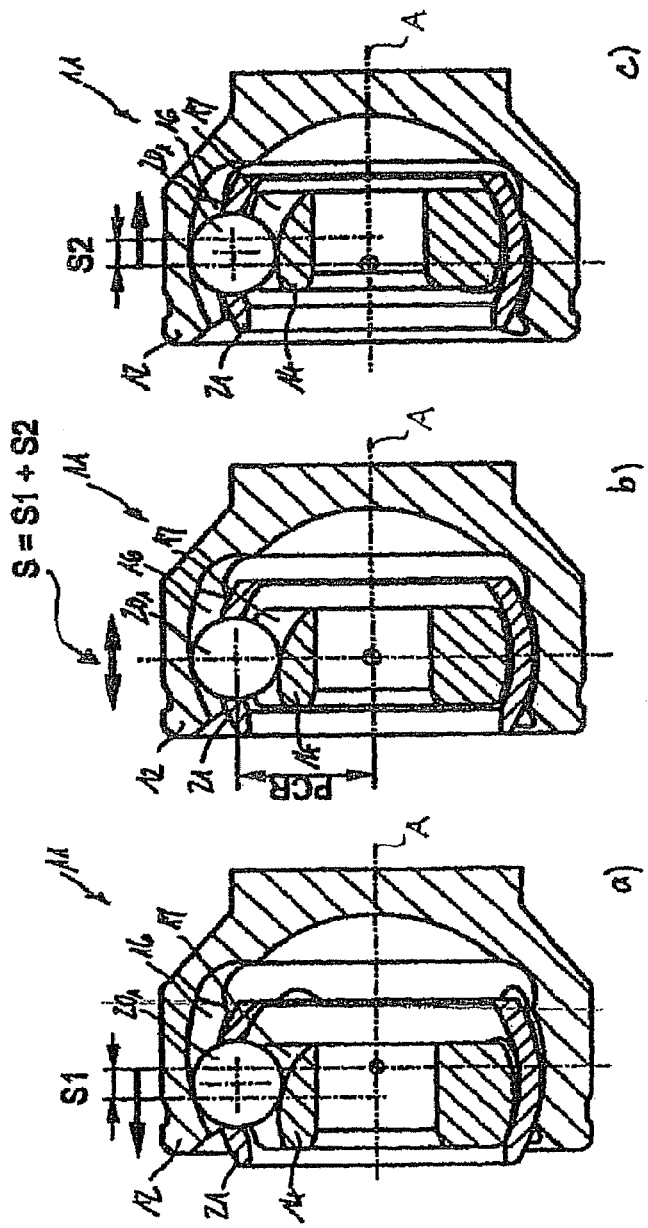
FIG. 4 is an illustration of the joint according to FIGS. 1 to 3 in a bent longitudinal section through a cage window and a cage web with supplementary dimensions
 a) in a first position axially displaced by the maximum amount
 b) in the central axial position
 c) in a second position axially displaced by the maximum amount

In FIG. 4, details identical to those shown in FIGS. 1 to 3 have been given the same reference numbers. To that extent, reference is made to the preceding description. The illustrations a), b) and c) largely correspond to illustrations a), b) and c) of FIG. 3. Illustration b), in addition, shows the pitch circle radius PCR of the balls from the central axis A to the ball centre 7 of the aligned joint. There is given the inventive range for the design conditions between the maximum displacement path S=S1+S2 and the pitch circle radius PCR with 0.01<S/PCR<0.09. The ratio between the total axial displacement S and the pitch circle radius PCR when the joint is in the aligned condition is preferably less than 0.05 (S/PCR<0.05). The axial forces are particularly low if the differences between the opening angles of the pairs of tracks are relatively small. When the joint is in the aligned condition, in the end positions of the relative axial displacement between the outer joint part and the inner joint part, the respective smaller opening angle α or β of the first pairs of tracks or of the second pairs of tracks is smaller than 8° (α<8° v β<8°). A further reduction in the opening angle of the pairs of tracks can be such that, when the joint is in the aligned condition, in a central position of the relative axial displacement path between the outer joint part and the inner joint part, in which the opening angles α and β of the first pairs of tracks and of the second pairs of tracks are identical in size, both opening angles α and β are smaller than 8° (α<8° ˆ β<8°).

Figure 5:
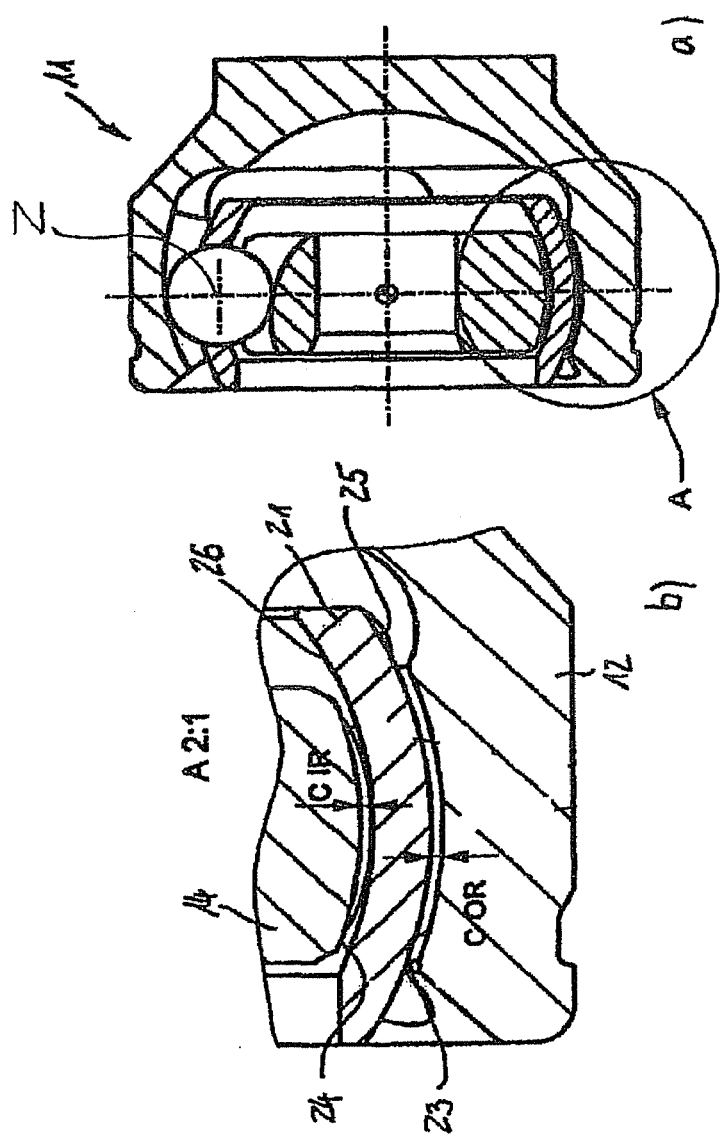
FIG. 5 shows the joint according to FIGS. 1 to 4
 a) in the illustration according to FIGS. 3b and 4b
 b) in an enlarged detail according to illustration a).

In FIG. 5 any details identical to those shown in FIG. 1 to 4 have been given the same reference numbers. To that extent, reference is made to the description of same. The illustration to Figure a) corresponds to the illustration according to FIG. 4b. In the enlarged detail according to Figure b), there are given the radial clearances CIR between the outer ball face 24 of the inner joint part 14 and the inner ball face 26 of the ball cage 21, as well as the radial clearances COR between the outer ball face 25 of the ball cage 21 and of the inner ball face 23 of the outer joint part 12. There are also given the ranges of said clearances as 0.015<CIR<0.20 and 0.015<COR<0.20, with said values referring to millimeters.

In FIG. 6, any details identical to those shown in FIGS. 1 to 5 have been given the same reference numbers. To that extent, reference is made to the description of same. The illustration to Figure a) corresponds to the illustration according to FIG. 4b, with the illustration b) showing an enlarged detail. Illustration b) shows the radial play BO of the ball in one pair of tracks 16, 18 as well as the axial play BC of the ball $20_1$ in the cage window 22, with the values for BC having been given as −0.03<BC<0.1 and the values for BO having been given as −0.03<BO<0.08; said values refer to millimeters.

FIG. 7 shows an inventive counter track joint with six pairs of tracks 16, 17; 18, 19 and thus six balls 20 in a longitudinal section and in a plan view. First and second pairs of tracks alternate around the circumference. Identical details have been given the same reference numbers as in the previous FIGS. 1 to 6. To that extent, reference is made to the respective descriptions.

FIG. 8 shows an inventive counter track joint with eight balls 20, with one longitudinal section A-A extending through first pairs of tracks 16, 17 and one longitudinal section B-B extending through second pairs of tracks 18, 19. First and second pairs of tracks alternate around the circumference. Identical details have been given the same reference numbers as in the previous FIGS. 1 to 6. To that extent, reference is made to the respective descriptions.

FIG. 9 shows the joint according to FIG. 7 with opening angles α and β of the first pairs of tracks which open in the first direction Ri1 and in the second direction Ri2 respectively. Details regarding the track centre lines of the ball tracks—as shown in FIG. 10—analogously also refer to the joint according to FIG. 8. The centre line M16 of the illustrated first outer ball tracks 16 in the outer joint part 12 consists of an arch with a first radius R2 with a centre O2 which is arranged on the longitudinal axis A with an axial offset relative to the central plane E towards the base; of a continuously adjoining arch with a smaller radius R3, whose centre O3 comprises the same axial offset towards the base as the centre O2 of R2; as well as of an arch with a counter radius R1 whose centre O1 comprises an axial offset relative to the central plane E in the opposite direction relative to the centeres O2, O3 of the arches with the radii R2, R3, i.e. towards the opening end, and whose centre O1 is positioned outside a circle with the radius R2 around the centre O2. It can be seen at the inner joint part that the centre line M1 7 of the illustrated first inner ball tracks 17 extends mirror-symmetrically relative to the centre plane E, i.e. it is composed of arches with the radii R2', R3' and R1' around the centres O2', O3', O1' identically, but mirror-symmetrically. The centre line M18 of the second outer ball track 18 comprises an arch with a first radius R5, whose centre O5 is positioned on the longitudinal axis A, with an axial offset which is opposed to the offset of the centre O2 of the arch with the radius R2, i.e. towards the opening end. The arch with the radius R5 is followed, towards the opening end, by an arch with the counter radius R4 whose centre O4 is positioned outside a circle with the radius R5 around the centre O5 and which comprises an axial offset towards the central plane E, which axial offset extends in the same direction. It can be seen that the centre line M19 of the second inner ball track 19 in the inner joint part 14 extends mirror-symmetrically relative to the centre line M18 of the second outer ball tracks 18, i.e. it is composed of arches with the radii R5' and R4' around the centres O5', O4', but mirror-symmetrically relative to the centre plane E. The first outer ball tacks 16 and the first inner ball tracks 17, in the central plane E, form the opening angle α which opens in the first direction Ri1, whereas the second outer ball tracks 18 and the second inner ball tracks 19 in the central plane form the opening angle β which opens in the opposite direction, i.e. in direction Ri2. When said inventive joint is axially displaced, which becomes possible as a result of the inventive cage clearance, the opening angles vary in opposite directions, with the joint changing from the position which is free from axial forces into positions in which there occur returning forces.

The term "axial offset" has the same meaning as the term "axial distance" and "axial offset" respectively.

FIGS. 11 to 18 each show an inventive driveshaft which, in the form of the first universal joint, comprises a counter track joint 11 of the above-described type similar to the embodiment according to FIG. 7; furthermore an intermediate shaft 31 (FIGS. 11 to 15) and an intermediate shaft with an integrated axial displacement unit 91 (FIGS. 16 to 18) as well as, finally, a second universal joint in the form of an axially plunging joint (FIGS. 11 to 14) and a second universal joint in the form of a fixed joint (FIGS. 15 to 18), respectively. The details of the first universal joint 11 have been given the same reference numbers as in the preceding Figures. To that extent, reference is made to the preceding description. The intermediate shaft 31 is connected via a plug-in connection to the components of the first universal joint 11 and of the second universal joint. The same applies to the multi-part intermediates shaft with an integrated plunging unit 91 which comprises a sleeve portion 92 with inner shaft toothing 93 as well as a plug-in journal 94 and, furthermore, a journal portion 95 with outer shaft toothing 96 which, in an axially plunging way, engages the inner shaft toothing 93.

A double arrow V1 at the second universal joint indicates the introduction of excitation forces into the second universal joint. A further double arrow V2 at the intermediate shaft 31, 91 indicates the transfer of said vibrations towards the first universal joint 11. In the detail relating to the first universal joint 11, a third double arrow V3 finally refers to the disconnection of the vibrational excitation in the first universal joint 11, wherein the inner joint part does not transmit any substantial forces to the outer joint part of the counter track joint which is thus held in a vibration-free condition.

The balls $20_1$, $20_2$ of the first universal joint 11 are illustrated with arrows for forces which axially extend in opposite directions, which forces symbolise the resulting freedom from axial forces.

Hereafter, only the respective second universal joints will be described.

Figure 11:
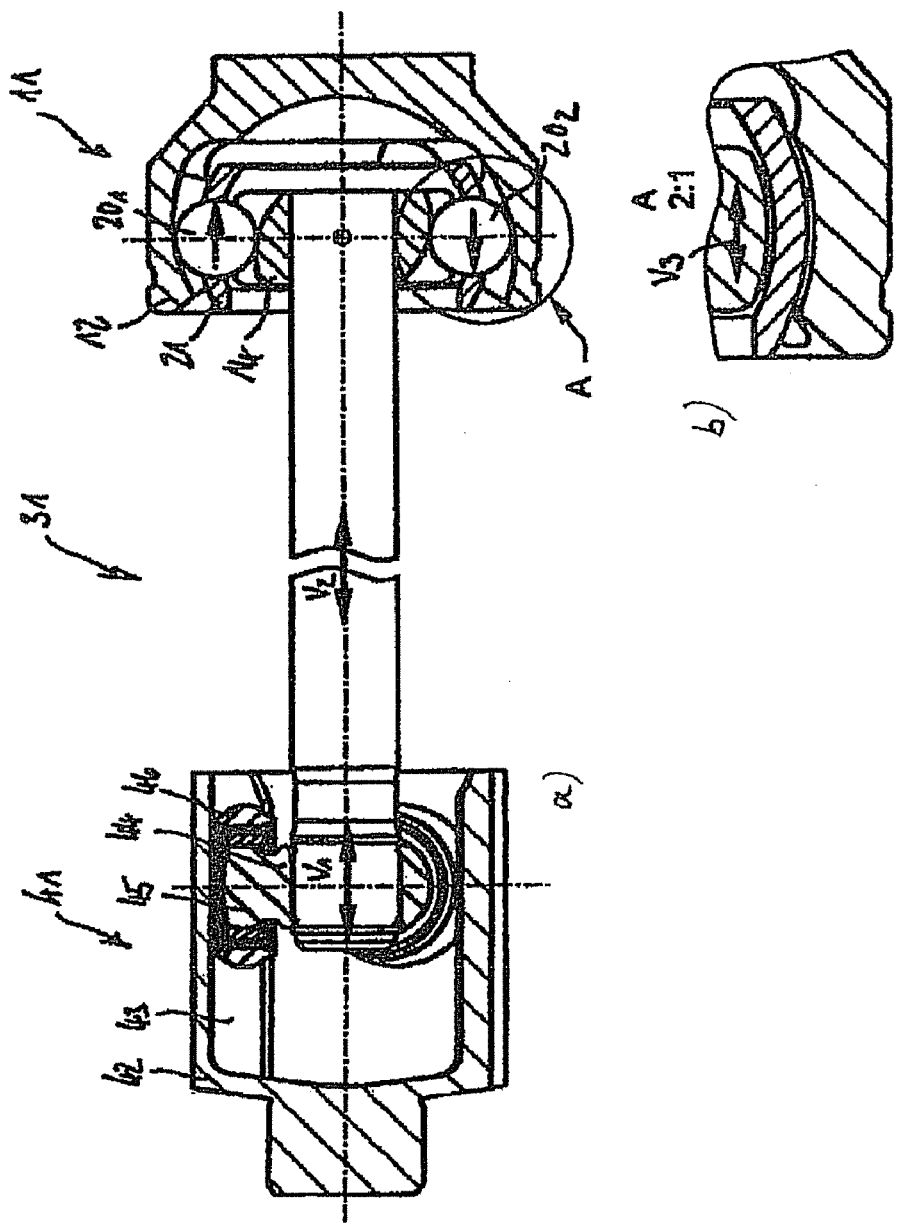
FIG. 11 is an illustration of an inventive driveshaft with an AAR tripod joint as the second universal joint: (a) in a longitudinal section, (b) in the enlarged detail according to (a).

FIG. 11, shows an AAR tripode joint 41 as the second universal joint which comprises an outer joint part 42 with three circumferentially distributed guiding tracks 43, a tripode star 44 with circumferentially distributed tripode arms 45 as well as rotatable roller assemblies 46 pivotably held on the tripode arms. The inner joint part 44 is axially displaceably held in the outer joint part 42, with the roller assemblies 46 being in rolling contact, and it is angularly movable relative to said outer joint part 42.

Figure 12:
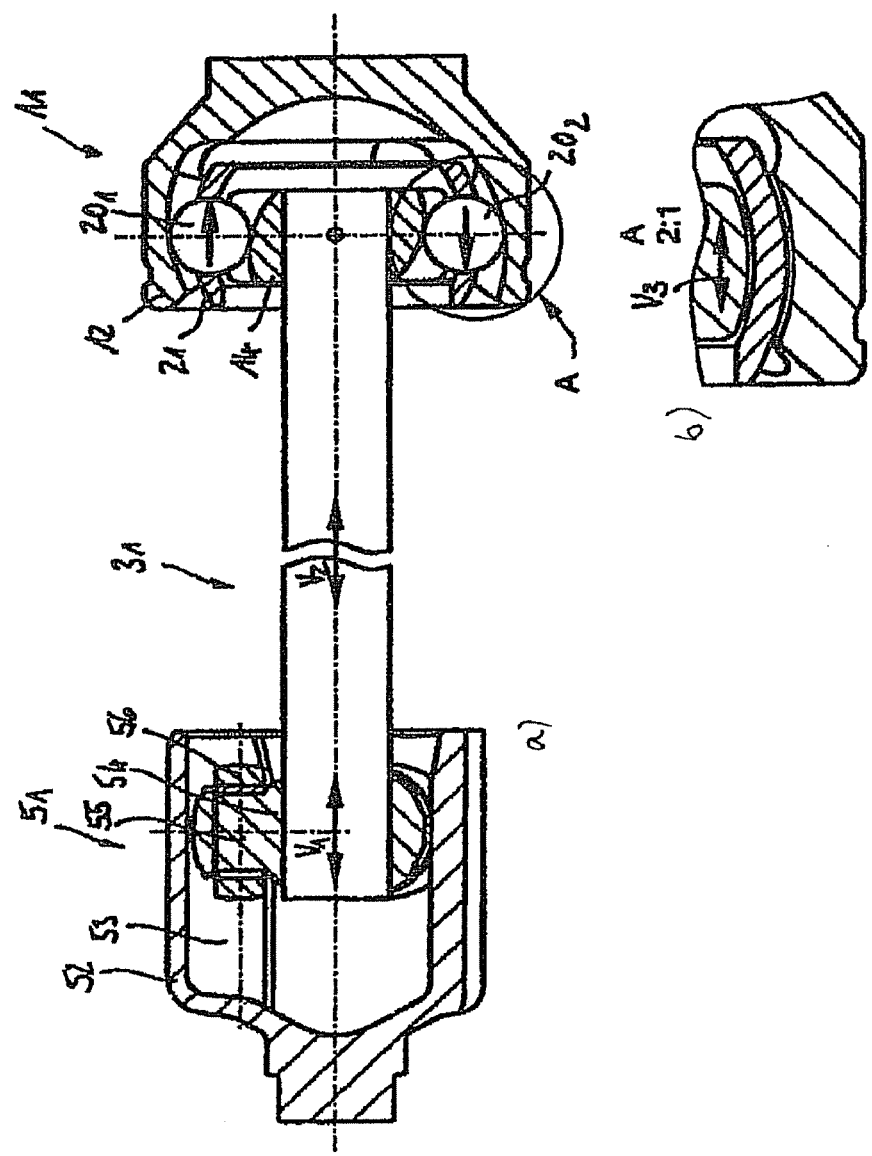
FIG. 12 is an illustration an inventive driveshaft with a GI tripod joint as the second universal joint: (a) in a longitudinal section, (b) in the enlarged detail according to (a).

FIG. 12 shows a GI tripode joint 51 as the second universal joint which comprises an outer joint part 52 with three circumferentially distributed guiding tracks 53, a tripode star 54 with circumferentially distributed tripode arms 55, as well as rollers 56 which are rotatably supported on the tripode arms. The inner joint part 54 is axially displaceably held in the outer joint part 52, with the rollers 56 carrying out a rolling movement, and can be articulated relative to said outer joint part 52.

Figure 13:
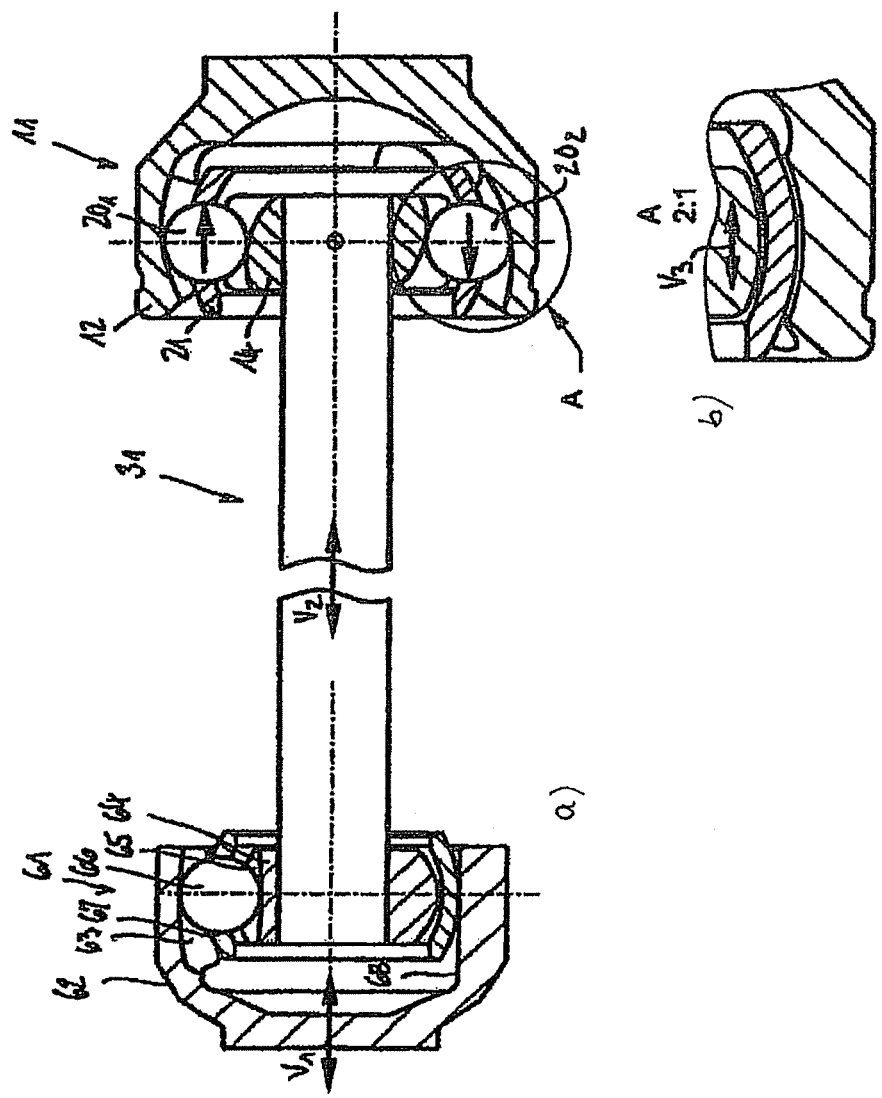
FIG. 13 is an illustration of an inventive driveshaft with a VL plunging ball joint as the second universal joint: (a) in a longitudinal section, (b) in the enlarged detail according to (a).

FIG. 13 shows a VL or XL plunging joint 61 as the second universal joint which comprises an outer joint part 62 with longitudinally extending outer ball tracks 63 which intersect the longitudinal axis, as well as an inner joint part 64 with longitudinally extending inner ball track 65 which intersect the longitudinal direction in the opposite direction, with there being provided torque transmitting balls 66 which are guided in outer ball tracks 63 and inner ball tracks 65 and which, in turn, are held by a cage 67 in a common plane. The cage 67 comprises an axial clearance relative to the inner joint part 64 and is guided in an inner cylindrical guiding face 68 of the outer joint part 62. In this way, the inner joint part 64 is held so as to be axially displaceable and articulatable relative to the outer joint part 62.

Figure 14:
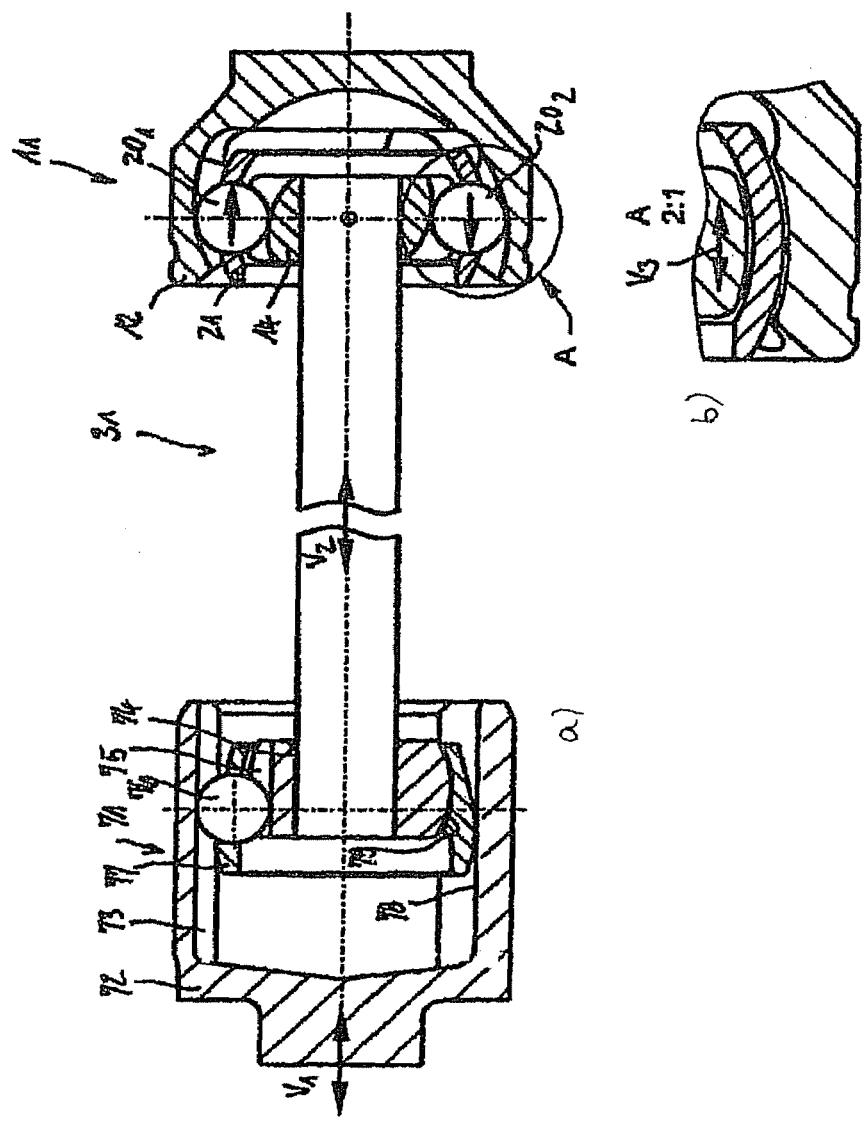
FIG. 14 is an illustration of an inventive driveshaft with a DO plunging joint as the second universal joint: (a) in a longitudinal section, (b) in the enlarged detail according to (a).

FIG. 14 shows a DO plunging joint as second universal joint which comprises an outer joint part 72 with axially extending outer ball tracks 73 as well as an inner joint part 74 with axially extending inner ball tracks 75. In pairs of outer ball tracks 73 and inner ball tracks 75 there are guided torque transmitting balls 76 which, in turn, are held by a cage 77 in a common plane. The cage 77 is held in an inner cylindrical guiding face 78 of the outer joint part 72 so as to be axially displaceable and articulatable, and on an externally spherical guiding face 79 of the inner joint part 74 so as to be articulatable only, so that, in this way, the inner joint part 74 is axially displaceably and articulatably guided relative to the outer joint part 72.

Figure 15:
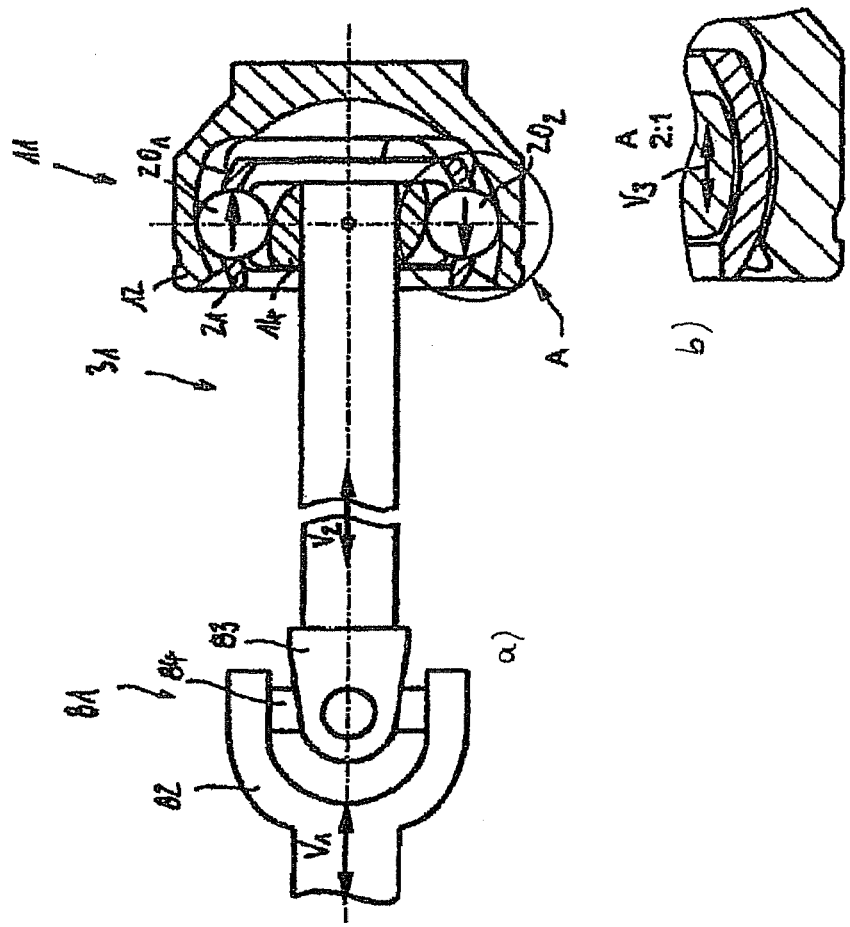
FIG. 15 is an illustration of an inventive driveshaft with a Hooke's joint as the second universal joint: (a) in a longitudinal section, (b) in the enlarged detail according to (a).

In the driveshaft according to FIG. 15 there is shown a cardan joint or Hooke's joint 81 as second universal joint. It comprises a first joint yoke 82 and a second joint yoke 83 which is rotated by 90° relative to said first joint yoke 82. The axial plunging unit is not shown, but can be assumed to be arranged in the interrupted part of the intermediate shaft 31.

Figure 16:
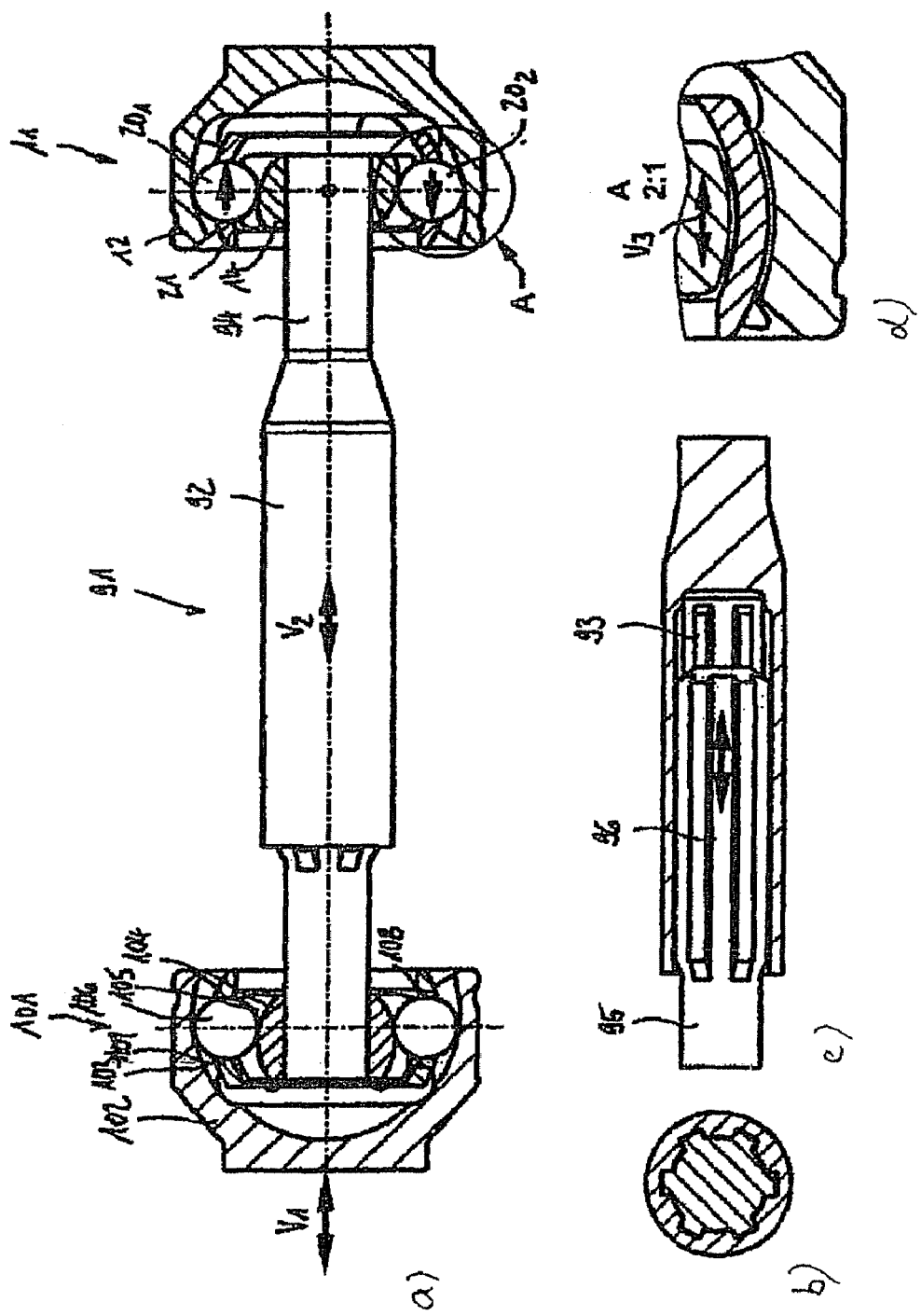
FIG. 16 is an illustration of an inventive driveshaft with an AC fixed joint as the second universal joint and an axial displacement unit: (a) in a first longitudinal section, (b) in a cross-section, (c) in a second longitudinal section, (d) in an enlarged detail according to (a).

FIG. 16, as second universal joint, shows an AC joint (angular contact joint) which comprises an outer joint part 102 with outer circularly curved ball tracks 103 and an inner joint part 104 with inner circularly curved ball tracks 105. In the pairs of tracks consisting of identical outer ball tracks 103 and inner ball tracks 105, which form opening angles pointing towards the intermediate shaft, there are accommodated torque transmitting balls 106 which are held by a ball cage 107 in a common plane. The ball cage 107 is pivotably held and axially supported in an inner spherical guiding face 108 of the outer joint part 102. An axial displacement between the two joints 11, 101 can take place inside the axial plunging unit 91.

Figure 17:
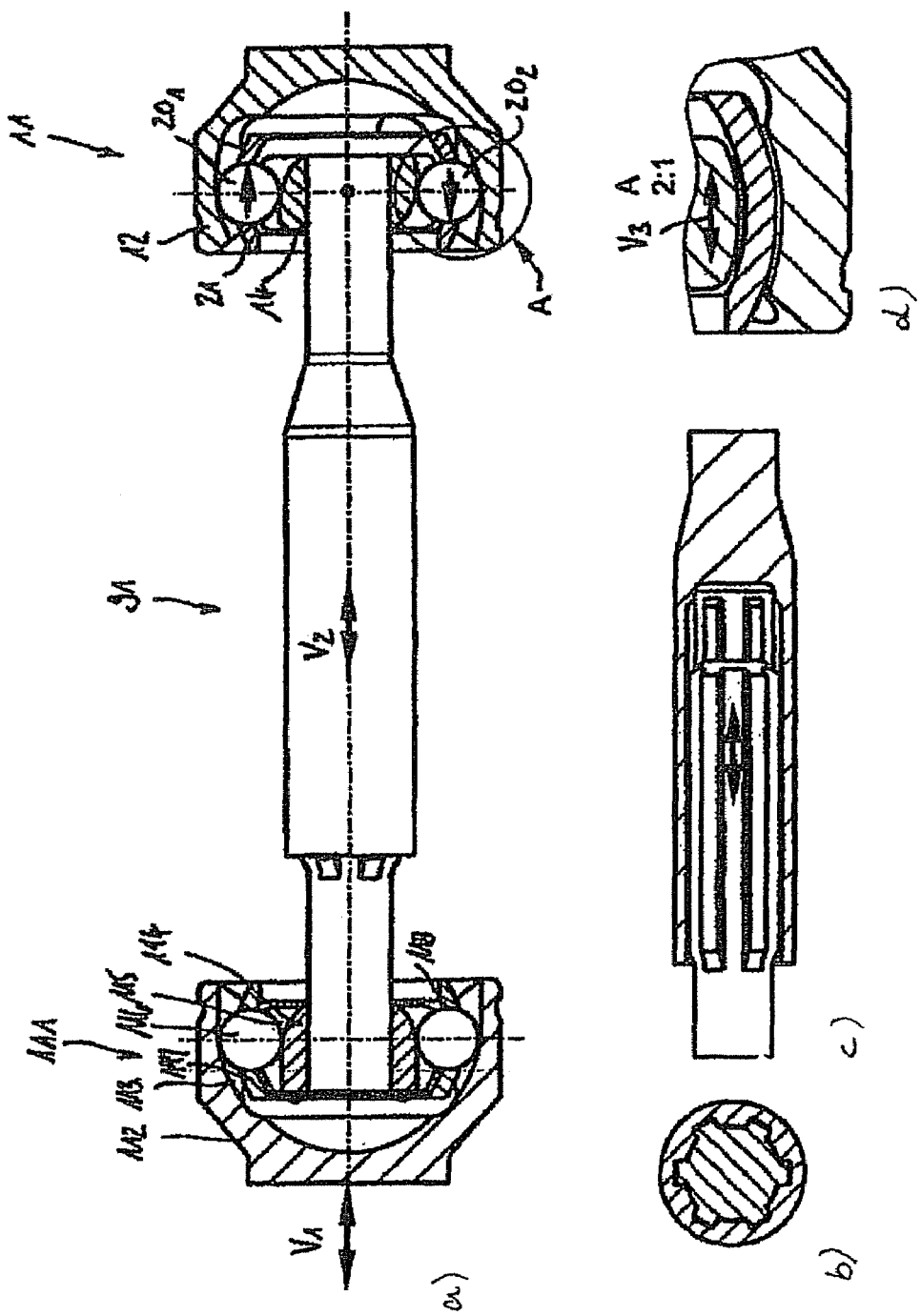
FIG. 17 is an illustration of an inventive driveshaft with a UF fixed joint as the second universal joint and an axial displacement unit: (a) in a first longitudinal section, (b) in a cross-section, (c) in a second longitudinal section, (d) in an enlarged detail according to (a).

FIG. 17, as second universal joint, shows a UF joint (undercut-free joint) with an outer joint part 112 with outer axially undercut-free ball tracks 113 and an inner joint part 114 with inner axially undercut-free ball tracks 115, wherein, in pairs of outer ball tracks 113 and inner ball tracks 115 forming angles pointing to the intermediate shaft, there are held balls 116 which, in turn, are held by a ball cage 117 in a common plane. The ball cage 117 is pivotably held and axially supported in an inner spherical guiding face 118 of the outer joint part 112. The joint is thus a fixed joint, so that the axial displacement has to take place between the first universal joint 11 and the second universal joint 111 inside the axial plunging unit 91.

In FIG. 18, the second universal joint is provided as counter track joint 11' which, in this case, is provided in the form of a fixed joint without the possibility of an axial displacement. The details have been given the same reference numbers as in the case of the first universal joint 11. The axial displacement between the first universal joint 11 and the second universal joint 11' can take place inside the axial plunging unit 91 in the way already described.

What is claimed is:

1. A driveshaft comprising:
   a first universal joint;
   an intermediate shaft; and
   a second universal joint, wherein said first universal joint is a constant velocity universal ball joint in the form of a counter track joint comprising an outer joint part with first and second outer ball tracks, an inner joint part with first and second inner ball tracks, wherein said first outer ball tracks, together with said first inner ball tracks, form a first pair of tracks which widen ($\alpha$) in a first axial direction (Ri1), and wherein said second outer ball tracks, together with said second inner ball tracks, form a second pair of tracks which widen ($\beta$) in a second axial direction (Ri2); a plurality of balls which are guided in said pairs of tracks and whose ball centers (Z) are positioned on a pitch circle radius (PCR) around a joint centre (M); a ball cage with circumferentially distributed cage windows, in which said ball cage said balls are held in a common central plane (E) and, when said first universal joint is articulated, are guided on to an angle-bisecting plane, wherein between said outer joint part and said ball cage on the one hand and between said ball cage and the inner joint on the other hand there are provided axial clearances which permit a relative axial displacement (S) between said outer joint part and said inner joint part, and wherein at said first universal joint, the ratio between a total axial displacement (S) and said pitch circle radius (PCR) of said balls—when said first universal joint is in an aligned condition—ranges between 0.01 and 0.09 (0.01<S/PCR<0.09).

2. A driveshaft according to claim 1, wherein at said first universal joint, the ratio between said total axial displacement (S) and said pitch circle radius (PCR) of said balls—when said first universal joint is in said aligned condition—is less than 0.05 (S/PCR<0.05).

3. A driveshaft according to claim 1, wherein at said first universal joint, when said first universal the joint is in said aligned condition, in a central position of said relative axial displacement path between said outer joint part and said inner joint part, in which said opening angles ($\alpha$) and ($\beta$) of the first pairs of tracks and of said second pairs of tracks are identical in size, both of said opening angles ($\alpha$) and ($\beta$) are smaller than 8° ($a<80°^\beta<8°$.).

4. A driveshaft according to claim 1, wherein at said first universal joint, an inner face of said outer joint part, an outer face of said inner joint part as well as the an outer cage face and an inner cage face of said ball cage are each faces of spherical portions, wherein a radial clearance (COR) between said outer joint part and said ball cage and a radial clearance (CR) between said ball cage and said inner joint part each ranges between 0.015 and 0.20 mm.

5. A driveshaft according to claim 1, wherein at said first universal joint, track centre lines M16 of said first outer ball tracks, centrally, comprise a first arch with the radius R2 whose centre O2 is offset by an axial offset from the central plane E of said first universe joint in a first direction, and that said track centre lines M16, subsequent to said first arch, in said first direction, increasingly deviate radially inwardly from said radius R2, and that said track centre lines M17 of said first inner ball tracks, centrally, comprise a second arch with the radius R2' whose centre O2' is offset by an axial offset from said central plane E of said first universal joint in a second direction, and that said track centre lines M17, subsequent to said second arch, in said second direction, increasingly deviate radially inwardly from said radius R2'.

6. A driveshaft according to claim 5, wherein at said first universal joint, said track centre lines M16 of said first outer ball tracks, subsequent to said first arch with said radius R2, in said first direction, comprise a third arch with a smaller radius R3 which is curved in the same direction and which continuously adjoins the former, and that said track centre lines M17 of said first inner ball tracks subsequent to said second arch with said radius R2', in said second direction, comprises a fourth arch with a smaller radius R3'which is curved in the same direction and which continuously adjoins the former.

7. A driveshaft according to claim 5, wherein at said first universal joint, said track centre lines M16 of said first outer ball tracks, subsequent to said first arch with said radius R2, in said second direction, increasingly deviate radially outwardly from said radius R2 and that said track centre lines M17 of said first inner ball tracks, subsequent to said second arch with said radius R2', in said first direction, increasingly deviate outwardly from said radius R2'.

8. A driveshaft according to claim 7, wherein at said first universal joint, said track centre lines M16 of said first outer ball tracks, subsequent to said first arch with said radius R2, in said second direction, comprise a fifth arch with radius R1, whose curvature extends in the opposite direction and which continuously adjoins the former and whose centre 01 is positioned outside a circle with a radius R2 around a centre M2 and that said track centre lines M17 of said first inner ball tracks, subsequent to said second arch with said radius R2', in said first direction, comprise a radius R1' whose curvature extends in the opposite direction, which continuously adjoins the former and whose centre O1' is positioned outside a circle with a radius R2' around a centre O2'.

9. A driveshaft according to claim 5, wherein at said first universal joint, track centre lines M18 of said second outer ball tracks centrally, comprise a sixth arch with radius R5 whose centre O5 is offset by an axial offset 5 from said central plane E of said first universal joint in said second direction, and that said track centre lines M18, subsequent to said sixth arch, in said second direction, increasingly radially outwardly deviate from said radius R5, and that track centre lines M19 of said second inner ball tracks, centrally, comprise a seventh arch with radius R5' whose centre 05' is offset by an axial offset from said centre plane E of said first universal joint in said first direction, and that said track centre lines M19, subsequent to said seventh arch, in said first direction, increasingly radially outwardly deviate from said radius R5'.

10. A driveshaft according to claim 9, wherein at said first universal joint, said track centre lines M18 of said second outer ball tracks, subsequent to said sixth arch with said radius R5, in said second direction, comprise an eighth arch with radius R4 whose curvature extends in the opposite direction and which continuously adjoins the former and whose centre O4 is positioned outside a circle with said radius R5 around said centre as, and that said track centre lines M19 of said second inner ball tracks, subsequent to said seventh arch with said radius R5', in said first direction, comprise an arch with the radius R4' whose curvature extends in the opposite direction and which continuously adjoins the former and whose centre O4' is positioned outside a circle with the radius R5' around said centre OS'.

11. A driveshaft according to claim 1, wherein said second universal joint is an axial plunging joint.

12. A driveshaft according claim 1, wherein said second universal joint is provided in the form of a fixed joint.

13. A driveshaft according to claim 1, wherein said intermediate shaft comprises an axial plunging unit.

14. A driveshaft according to claim 1, wherein at said outer joint part of said first universal joint, after having been deformed, an inner spherical face is only soft-turned and hardened and that said ball tracks are only hardened and ground.

\* \* \* \* \*

UNITED STATES PATENT AND TRADEMARK OFFICE
CERTIFICATE OF CORRECTION

PATENT NO. : 7,621,816 B2
APPLICATION NO. : 12/045687
DATED : November 24, 2009
INVENTOR(S) : Thomas Weckerling et al.

It is certified that error appears in the above-identified patent and that said Letters Patent is hereby corrected as shown below:

In the Claims:

Column 10, line 65, delete "the" before "joint is in said"

Column 11, line 7, delete "the" before "an outer cage face"

Column 11, line 11, change "(CR)" to --(CIR)--

Column 11, line 17, change "universe" to --universal--

Column 11, line 35, change "R3'which" to --R3' which--

Column 12, line 39, insert --to-- before "claim 1"

Signed and Sealed this

Nineteenth Day of January, 2010

David J. Kappos
*Director of the United States Patent and Trademark Office*

UNITED STATES PATENT AND TRADEMARK OFFICE
CERTIFICATE OF CORRECTION

PATENT NO.        : 7,621,816 B2                                                Page 1 of 1
APPLICATION NO. : 12/045687
DATED             : November 24, 2009
INVENTOR(S)       : Thomas Weckerling et al.

It is certified that error appears in the above-identified patent and that said Letters Patent is hereby corrected as shown below:

In the Claims:

Claim 3, Column 11, line 4, change "(a<80°^ β <8°.)" to --(a<8° ∧ β<8°)--

Claim 8, Column 12, line 1, change "centre 01" to --centre O1--

Claim 8, Column 12, line 2, change "centre M2" to --centre O2--

Claim 9, Column 12, line 18, change "centre 05'" to --centre O5'--

Claim 10, Column 12, line 30, change "centre as" to --centre O5--

Claim 10, Column 12, line 36, change "centre OS'" to --centre O5'--

Signed and Sealed this

Ninth Day of March, 2010

David J. Kappos
*Director of the United States Patent and Trademark Office*